(12) United States Patent
Buehrer et al.

(10) Patent No.: US 7,912,818 B2
(45) Date of Patent: *Mar. 22, 2011

(54) WEB GRAPH COMPRESSION THROUGH SCALABLE PATTERN MINING

(75) Inventors: Gregory T. Buehrer, Columbus, OH (US); Kumar Hemachandra Chellapilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,747

(22) Filed: Sep. 13, 2010

(65) Prior Publication Data

US 2010/0332476 A1 Dec. 30, 2010

Related U.S. Application Data

(63) Continuation of application No. 12/022,136, filed on Jan. 29, 2008, now Pat. No. 7,818,303.

(51) Int. Cl.
*G06F 17/00* (2006.01)
(52) U.S. Cl. ......... 707/693; 707/790; 707/802; 715/205
(58) Field of Classification Search .................. 707/693, 707/790, 802, 999.101; 715/205, 242
See application file for complete search history.

(56) References Cited

U.S. PATENT DOCUMENTS

| | | | |
|---|---|---|---|
| 6,073,135 A | 6/2000 | Broder et al. | |
| 6,138,113 A | 10/2000 | Dean et al. | |
| 6,556,983 B1 * | 4/2003 | Altschuler et al. | 706/55 |
| 6,886,129 B1 | 4/2005 | Raghavan et al. | |
| 6,920,477 B2 * | 7/2005 | Mitzenmacher | 709/203 |
| 7,089,252 B2 | 8/2006 | Tomlin et al. | |
| 2004/0210826 A1 * | 10/2004 | Najork | 715/501.1 |
| 2006/0026191 A1 | 2/2006 | McSherry | |
| 2007/0168533 A1 | 7/2007 | Canright | |
| 2007/0220064 A1 | 9/2007 | Najork | |

OTHER PUBLICATIONS

Boldi, et al., "The WebGraph Framework I: Compression Techniques", WWW'2004, May 17-22, 2004, ACM, pp. 595-602.*
Mahdian et al., "Pre-Compression Algorithm for Link Structure of the Web", 1 Ith CSI Computer Conference (CSICC'2006), School of Computer Science, IPM, Jan. 24-26, 2006, pp. 1-5.*
Claude, et al., "A Fast and Compact Web Graph Representation", 2007, pp. 118-129.*
Boldi, et al., "The WebGraph Framework I: Compression Techniques", WWW'2004, May 17-22, 2004, ACM, pp. 595-602.
Mahdian, et al., "Pre-Compression Algorithm for Link Structure of the Web", 1 Ith CSI Computer Conference (CSICC'2006), School of Compter Science, IPM, Jan. 24-26, 2006, pp. 5.

(Continued)

*Primary Examiner* — Fred I Ehichioya
(74) *Attorney, Agent, or Firm* — Capitol City TechLaw; Richard C. Irving (57) ABSTRACT

A method and a processing device are provided for compressing a web graph including multiple nodes and links between the multiple nodes. Nodes of the web graph may be clustered into groups including no more than a predetermined number of nodes. A list of links of the clustered nodes may be created and sorted based on a frequency of occurrence of each of the links. A prefix tree may be created based on the sorted list of links. The prefix tree may be walked to find candidate virtual nodes. The candidate virtual nodes may be analyzed according to a selection criteria and a virtual node may be selected. The prefix tree may be adjusted to account for the selection of the virtual node and the virtual node may be added to the web graph.

11 Claims, 11 Drawing Sheets

OTHER PUBLICATIONS

Claude, et al., "A Fast and Compact Web Graph Representation", vol. 4726, 2007, pp. 11.

"WebGraph", retrieved at <<http://webgraph.dsi.unimi.it/>>, pp. 3.

* cited by examiner

WEB GRAPH COMPRESSION THROUGH SCALABLE PATTERN MINING

This application is a continuation application of co-pending U.S. patent application Ser. No. 12/022,136, filed in the U.S. Patent and Trademark Office on Jan. 29, 2008.

BACKGROUND

The world wide web has approximately 11.5 billion pages and more than 300 billion links among the pages. If many pages with similar hyperlink text point to a same page, one may infer that the page contains information pertinent to the text.

Dedicated systems, such as, for example, connectivity servers or link servers, were developed to query a structure of the web. Dense bipartite graphs, cliques, or other connected components in the structure may be inspected for interesting correlations. However, if a graph of the web is too large to fit into memory, frequent disk seeks may make such dedicated systems useless.

Some existing strategies order vertices by corresponding Universal Resource Locators (URLs), such that significant overlap in outlinks may occur from node to node. Further, sorted outlinks may have small differences in destination IDs. Thus, gap coding may be employed to encode differences in successive IDs, instead of the ID, itself. However, global ordering of URLs may be fairly expensive.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided for compressing a web graph. Similar nodes of a graph may be clustered into groups of nodes having no more than a predetermined number of nodes. The groups of nodes may be clustered by applying k hash functions, such as, for example, perfect hash functions, or other hash functions, to each link of each of the nodes to produce corresponding k minhash values for each of the nodes. A n×k matrix may be produced, such that each row of the matrix may correspond to a node of the graph and may include corresponding k minhash values. The n×k matrix may then be lexicographically sorted and a group of nodes may be clustered based on matching corresponding minhash values. A prefix tree may be created based on a list of links of the clustered nodes. The list of links may be sorted in a descending order, based on a frequency of occurrence of each of the links. The prefix tree may be walked to find repeating patterns, based upon which, candidate virtual nodes may be added to a list of candidate virtual nodes. Candidate virtual nodes may be selected as virtual nodes based on a selection criteria, such as, a highest compression performance, or another criteria. The selected virtual nodes may be added to the graph and links corresponding to links of the virtual node may be replaced with links to the virtual node.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a processing device for performing web graph compression in a more efficient manner than prior art techniques.

Similar nodes of a graph may be clustered into groups of nodes having a maximum number of nodes. In various embodiments, the maximum number may be 100, 500, 1000, or another suitable value. One technique, which may be employed to cluster groups of nodes, may include applying k perfect hash functions to each link of each of the nodes to produce corresponding k hash values. For each of the links of each of the nodes, a minimum hash (minhash) value of the k hash values may be selected. A n×k matrix may then be produced, where each row of the matrix may correspond to a node of the graph, and may include respective minhash values corresponding to links, such as, for example, outlinks, or other links, of the node. Rows of the matrix may then be lexicographically sorted. As will be described below, a group of nodes may be clustered based on matching minhash values of one or more columns of the matrix.

A prefix tree may be created based on a list of links of the clustered nodes, sorted by frequency of occurrence. In some embodiments, the list of links may be sorted in a descending order, based on the frequency of occurrence of each of the links. The prefix tree may be walked to find repeating patterns, based upon which, candidate virtual nodes may be added to a list.

Each of the candidate virtual nodes may be evaluated to determine a respective compression performance. One of the candidate virtual nodes having a best compression performance may be selected as a virtual node. The virtual node may be added to the graph and the links of the graph, corresponding to links of the virtual node, may be replaced or substituted with links to the virtual node.

Exemplary Processing Device

Figure 1:
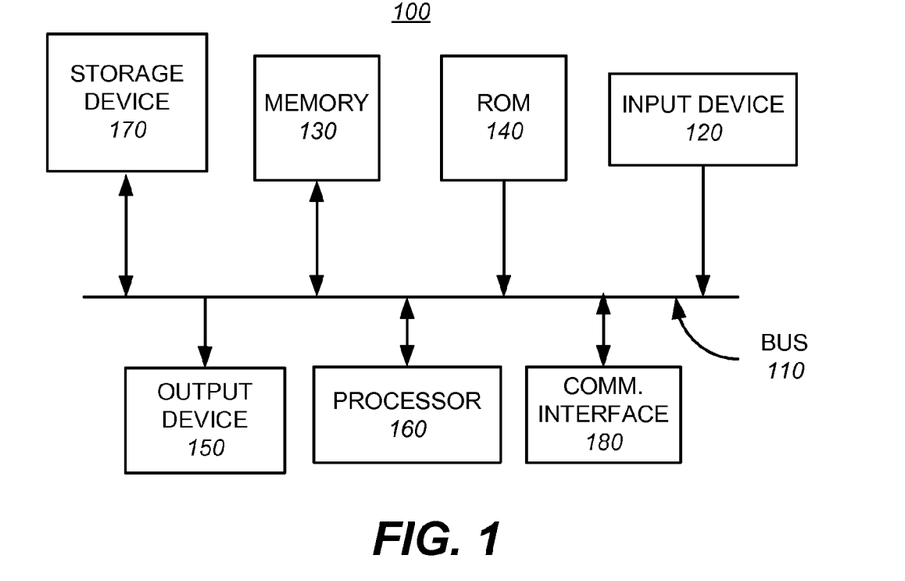
FIG. 1 illustrates a functional block diagram of an exemplary processing device, which may implement embodiments consistent with subject matter of this disclosure.

FIG. 1 is a functional block diagram of an exemplary processing device 100, which may be used to implement embodiments consistent with the subject matter of this disclosure. Processing device 100 may be a desktop personal computer (PC), a laptop PC, a handheld processing device, a server, a server farm, or other processing device. Processing device 100 may include a bus 110, an input device 120, a memory 130, a read only memory (ROM) 140, an output device 150, a processor 160, a storage device 170, and a communication interface 180. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include compact disc (CD), digital video disc (DVD), a magnetic medium, or other type of storage device for storing data and/or instructions for processor 160.

Input device 120 may include a keyboard, a pointing device or other input device. Output device 150 may include one or more conventional mechanisms that output information, including one or more display monitors, or other output devices. Communication interface 180 may include a transceiver for communicating via one or more networks via a wired, wireless, fiber optic, or other connection.

Processing device 100 may perform such functions in response to processor 160 executing sequences of instructions contained in a tangible machine-readable medium, such as, for example, memory 130, ROM 140, storage device 170 or other medium. Such instructions may be read into memory 130 from another machine-readable medium or from a separate device via communication interface 180.

Exemplary Operating Environment

A single processing device 100 may implement some embodiments consistent with the subject matter of this disclosure. Multiple networked processing devices 100 may implement other embodiments consistent with the subject matter of this disclosure.

Figure 2:
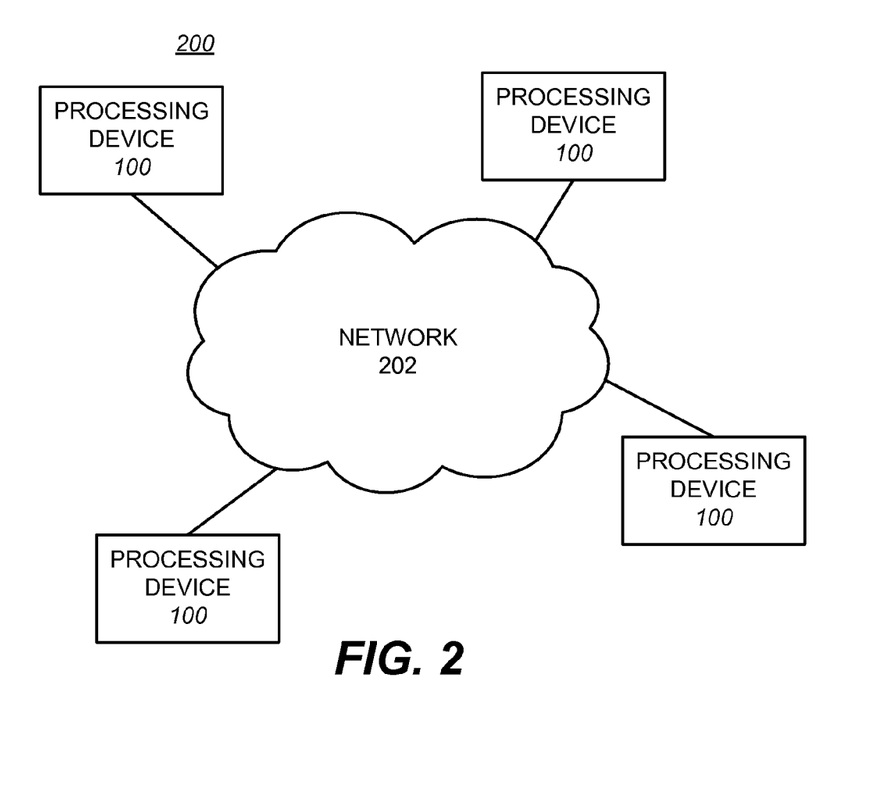
FIG. 2 illustrates an exemplary operating environment for some embodiments consistent with the subject matter of this disclosure.

FIG. 2 illustrates an exemplary operating environment 200 in which some embodiments consistent with the subject matter of this disclosure may operate. Exemplary operating environment 200 may include multiple processing devices 100, which may communicate with one or more others of the multiple processing devices via a network 202.

Network 202 may be a single network or a combination of networks, such as, for example, the Internet or other networks. Network 102 may include a wireless network, a wired network, a packet-switching network, a public switched telecommunications network, a fiber-optic network, other types of networks, or any combination of the above.

Exemplary Operation

Figure 3:
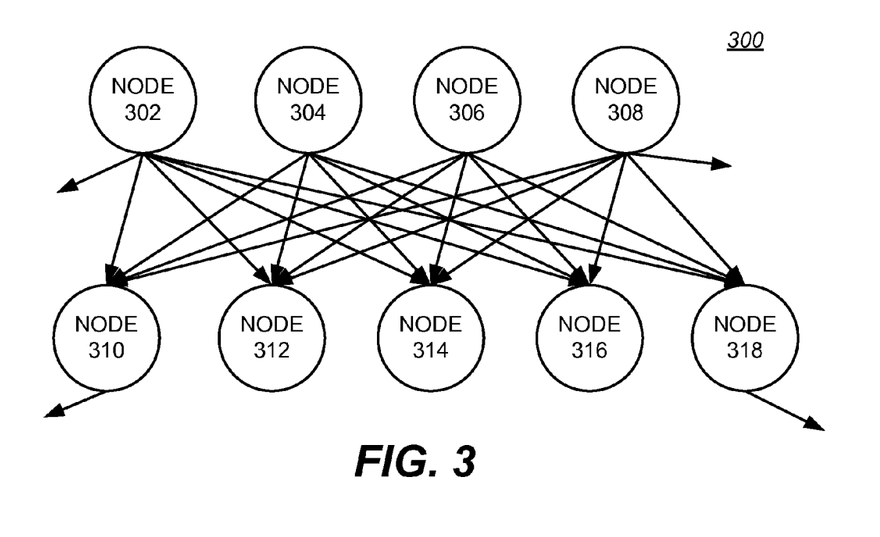
FIG. 3 illustrates an exemplary bipartite graph of linked nodes.
Figure 4:
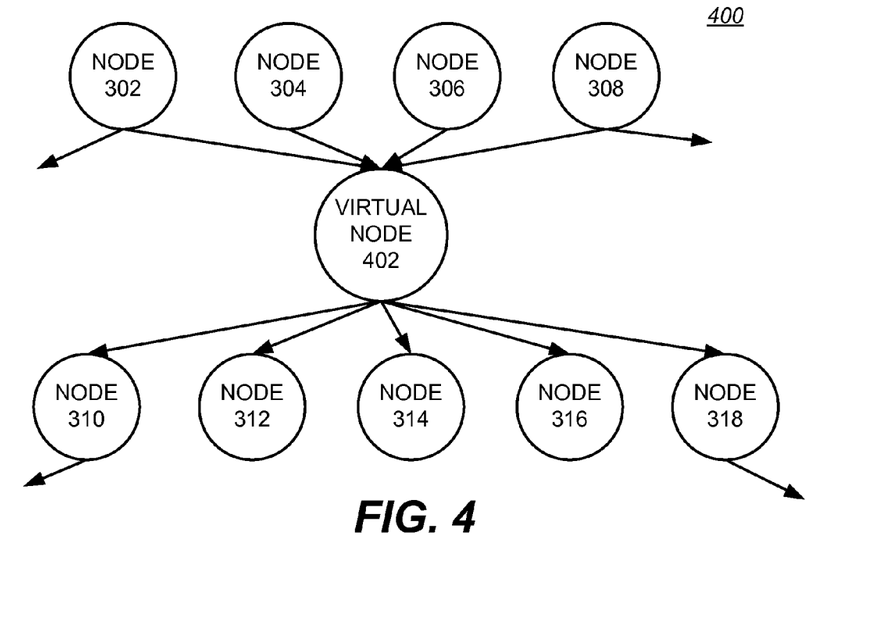
FIG. 4 illustrates the graph of FIG. 3 after a virtual node is added.

FIG. 3 illustrates a portion of an exemplary web graph 300 including nodes 302-318. Nodes 302-308 are linked to nodes 310-318 and may be linked to other nodes. In some embodiments, the nodes may represent respective network documents, such as, for example, web pages, or other network documents. Each link may represent a hyperlink from one web page to another web page. Exemplary web graph 300 may be called a bipartite web graph. Examination of the nodes and the links of web graph 300 may reveal at least one pattern. For example, four nodes, nodes 302, 304, 306, and 308, each have links to nodes 310, 312, 314, 316, and 318. As a result, as shown in FIG. 4, a virtual node 402 may be added to web graph 300 to produce web graph 400, and links from each of nodes 302, 304, 306, and 308 may be replaced, or substituted, with respective links to virtual node 402. Virtual node 402 may further have links to each of the nodes 310, 312, 314, 316, and 318. Comparing web graph 300 with web graph 400, one can easily determine that 20 link paths have been compressed to nine link paths.

Clustering

Each node of a web graph may have a number of associated links, such as, for example, outlinks, or other links. Each of the links may have k different hash functions applied to a corresponding link ID to produce k hash values. The hash functions may be perfect hash functions, such that no collisions may be produced. From each of the corresponding k hash values of the links, a minimum hash (minhash) value may be saved and a row may be added to a matrix. The row may include a node ID and k minhash values. When the matrix is complete, the matrix may be a n×k matrix, where n is a number of nodes and k is a number of different hash functions.

The matrix may then be lexicographically sorted. An example of a portion of a lexicographically sorted matrix may include:

| Node ID | MinHashes | | | |
|---|---|---|---|---|
| 3 | 1 | 1 | 3 | 4 |
| 5 | 1 | 1 | 3 | 6 |
| 8 | 1 | 1 | 4 | 8 |

Figure 5:
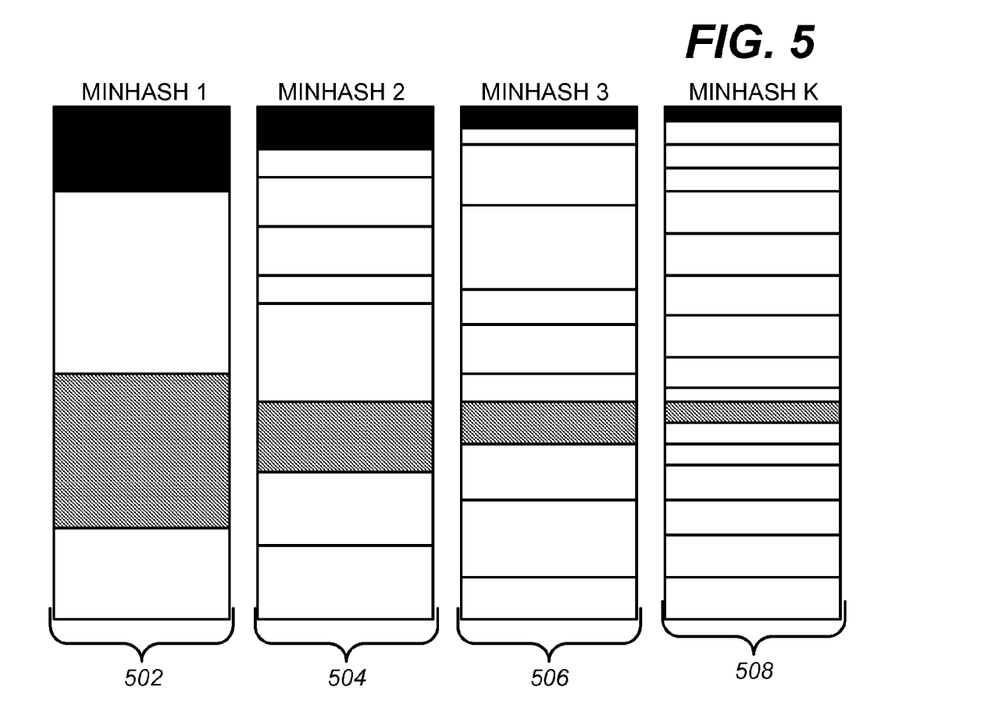
FIG. 5 illustrates a telescoping property with respect to a method for clustering similar nodes.

As one may notice above, after the matrix is lexicographically sorted, a telescoping effect may be observed. For example, a number of minhash values corresponding to a first minhash value among the nodes of the matrix may match, a smaller number of minhash values corresponding to a second minhash value may match, an even smaller number of minhash values corresponding to a third minhash value may match, and a further smaller number of minhash values corresponding to a $k^{th}$ minhash may match. FIG. 5 illustrates this telescoping effect in which column 502 may include minhash values with respect to a first minhash, column 504 may include many hash values with respect to a second minhash, column 506 may include minhash values with respect to a third minhash, and column 508 may include minhash values with respect to a $k^{th}$ minhash. The black and gray areas of FIG. 5 illustrate exemplary respective matching minhash values.

In embodiments consistent with the subject matter of this disclosure, less than a predetermined number of nodes may be clustered and passed to a mining stage, which may search for one or more patterns regarding the clustered nodes. For example, a first group of nodes, which may match with respect to a first minhash value, may be counted. If the count is not less than the predetermined number of nodes, then a second group of nodes, which may match with respect to a first minhash value and a second minhash value may be counted. If the count is not less than the predetermined number of nodes, then a third group of nodes, which may match with respect to a first minhash value, a second minhash value, and a third minhash value may be counted. The above may be repeated until a counted group of nodes has less than the predetermined number of nodes.

The above clustering of nodes illustrates the Jaccard similarity, J. According to the Jaccard similarity, $$J(A, B) = \frac{|A \cap B|}{|A \cup B|},$$

where A and B are sets, $|A \cap B|$ is the number of elements that are included in both of sets A and B, and $|A \cup B|$ is the number of elements that are included in either or both of sets A and B. The more similar that sets A and B are, the more J(A, B) approaches 1. If sets A and B are exactly equal, then J(A, B)=1. The more dissimilar that sets A and B are, the closer J(A, B) approaches 0. If sets A and B have no elements in common, then J(A, B)=0. Stated in another way, in embodiments consistent with the subject matter of this disclosure, the more similar that two sets are, the more likely that sampled elements (minhash values) will be equal.

Mining

Figure 6:
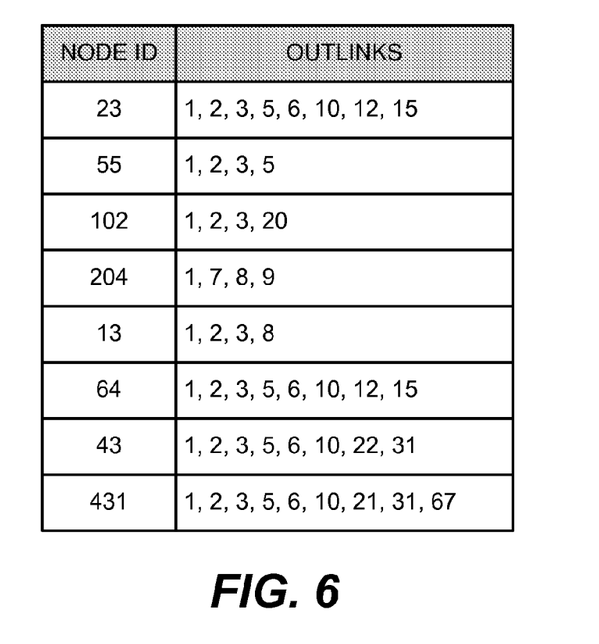
FIG. 6 is a table of node IDs and corresponding outlinks used to illustrate exemplary processing with respect to embodiments consistent with the subject matter of this disclosure.

FIG. 6 illustrates an exemplary cluster of nodes produced as a result of clustering. The clustered nodes may include: node 23 having links 1, 2, 3, 5, 6, 10, 12, and 15; node 55 having the links 1, 2, 3, and 5; node 102 having links 1, 2, 3, and 20; node 204 having links 1, 7, 8, and 9; node 13 having links 1, 2, 3, and 8; node 64 having links 1, 2, 3, 5, 6, 10, 12, and 15; node 43 having links 1, 2, 3, 5, 6, 10, 22, and 31; and node 431 having links 1, 2, 3, 5, 6, 10, 21, 31, and 67.

A histogram may be created with respect to frequencies of occurrence of each of the links within the cluster of nodes. Based on the exemplary cluster of FIG. 6, one can see that link 1 occurs 8 times, link 2 occurs 7 times, link 3 occurs 7 times, link 5 occurs 5 times, link 6 occurs 4 times, link 7 occurs 1 time, link 8 occurs 2 times, link 9 occurs 1 time, link 10 occurs 4 times, link 12 occurs 2 times, link 15 occurs 2 times, link 20 occurs 1 time, link 21 occurs 1 time, link 20 occurs 1 time, link 31 occurs 2 times, and link 67 occurs 1 time.

A list of the links may be sorted according to a respective frequency of occurrence of each link of the cluster. In some embodiments, the links may be sorted in a descending order with respect to the frequencies of occurrence. Thus, in the current example, the sorted list of links may be: 1, 2, 3, 5, 6, 10, 8, 12, 15, 31, 7, 67.

Figure 7:
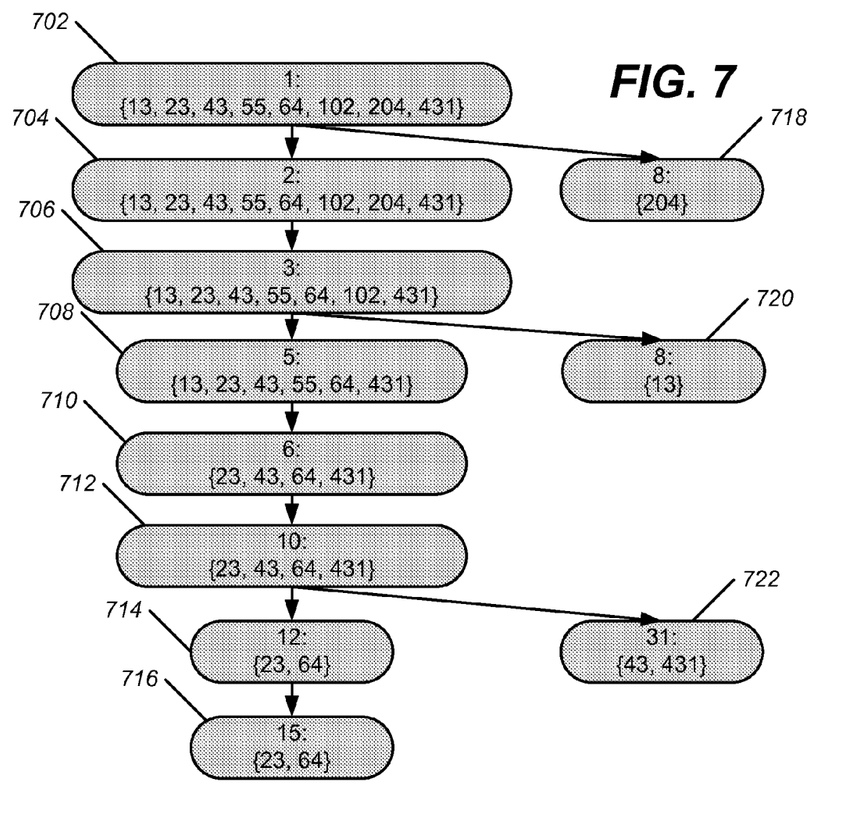
FIG. 7 illustrates an exemplary prefix tree constructed based on the table of FIG. 6.

Next, a prefix table may be created based on the sorted list of links. FIG. 7 shows a prefix table which may be created based upon the sorted list of links for the above example. In this example, only items corresponding to links having a frequency of occurrence greater than a predetermined number may be added to the prefix table. In this example, only items corresponding to links having a frequency of occurrence greater than 1 may be added to the prefix table. Although, in other embodiments, a different predetermined number of frequencies of occurrence may be used. A first item, item 702, may be a root of the prefix table. Item 702 corresponds to link 1, which is associated with a node list including nodes 13, 23, 43, 55, 64, 102, 204, and 431. A next item, item 704, may be a child item of item 702, may correspond to link 2, and may be associated with a node list including nodes 13, 23, 43, 55, 64, 102, 204, and 431. A third item, item 706, may be a child item of item 704, may correspond to link 3, and may be associated with a node list including nodes 13, 23, 43, 55, 64, 102, and 431. A fourth item, item 708, may be a child item of item 706, may correspond to link 5, and may be associated with a node list including nodes 13, 23, 43, 55, 64, and 431. A fifth item, item 710, may be a child item of item 706, may correspond to link 6, and may be associated with a node list including nodes 23, 43, 64, and 431. A sixth item, item 712, may be a child item of item 710, may correspond to link 10, and may be associated with a node list including nodes 23, 43, 64, and 431. Links 8, 12, and 15 have a frequency of occurrence of 2. However, nodes 23 and 64 are associated with both links 10 and 12. Therefore, item 714 may be a child item of item 712, may correspond to link 12, and may be associated with a node list including nodes 23 and 64. Link 15 has a frequency of occurrence of 2 and is associated with a node list including nodes 23 and 64. Therefore, item 716 may be a child item of item 714, may correspond to link 15, and may be associated with a node list including nodes 23 and 64. Link 8 has a frequency of occurrence of 2. Links 1 and 8 may be associated with node 204. Therefore, item 718 may be a child item of item 702, may correspond to link 8, and may be associated with a node list including node 204. Links 1, 2, 3, and 8 may be associated with node 13. Therefore, item 720 may be a child item of item 706, may correspond to Lake 8, and may be associated with a node list including node 13. Link 31 has a frequency of occurrence of 2 and may be associated with a node list including nodes 43 and 431. Therefore, item 722 may be a child item of item 712, may correspond to link 31, and may be associated with a node list including nodes 43 and 431.

Figure 8:
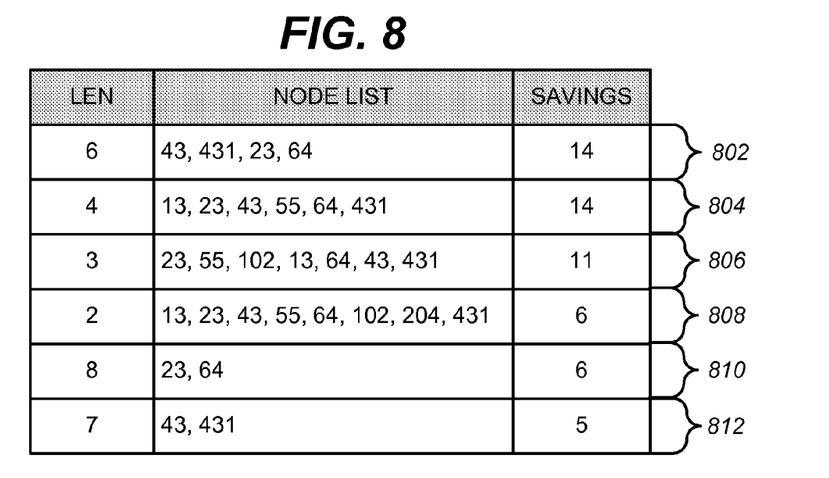
FIG. 8 illustrates an exemplary list of candidate nodes which may be produced as a result of processing the prefix table of FIG. 7.

Next, a list of candidates a virtual nodes may be created based on the prefix table. FIG. 8 illustrates a list of candidate virtual nodes based on the prefix table of FIG. 7. To find a candidate virtual node, the prefix table may be walked from a root node, item 702, as far down the prefix tree as possible until either a leaf is reached, or until no further items down the prefix tree have more than the predetermined number of associated nodes in node lists. As mentioned previously, in this example, the predetermined number is one. Although, in other embodiments, other predetermined numbers may be used.

One can see, from FIG. 7, that when walking the prefix tree, item 716 may be reached. Item 716 has a depth of 8 and is associated with nodes 23 and 64. This information may be entered into the list of candidate virtual nodes of FIG. 8 as an entry 812 and item 716 may be marked as processed.

Next, the prefix tree may be walked back toward the root until an unprocessed item is found having more associated nodes than item 716. As the prefix tree is walked toward the root, items may be marked as processed. Thus, items 714 and 712 may be marked as processed. Item 712 is an item having a larger node list than item 716. Item 712 has a depth of 6 and is associated with nodes 23, 43, 64 and 431. This information may be entered into the list of candidate nodes of FIG. 8, as an entry 802.

The prefix tree may again be walked back toward the root until an item is found having more associated nodes that an item 712. Walking back toward the root, items 710 and 708 may be marked as processed. Item 708 is an item having more associated nodes than items 712. Item 708 has a depth of 4 and is associated with nodes 13, 23, 43, 55, 64, and 431. This information may be entered into the list of candidate nodes FIG. 8, as an entry 804.

The prefix tree may again be walked back toward the root until an item is found having more associated nodes that item 708. Walking back toward the root, item 706 may be marked as processed. Item 706 is an item having more associated nodes than item 708. Item 706 has a depth of 3 and is associated with nodes 13, 23, 43, 55, 64, 102 and 431. This information may be entered into the list of candidate nodes of FIG. 8, as entry 806.

The prefix tree may again be walked back toward the root until an item is found having more associated nodes than item 706. Walking back toward the root, item 704 may be marked as processed. Item 704 is an item having more associated nodes than item 706. Item 704 has a depth of 2 and is associated with nodes 13, 23, 43, 55, 64, 102, 204 and 431. This information may be entered into the list of candidate nodes of FIG. 8, as entry 808.

When selecting candidate virtual nodes, the process is concerned with items of the prefix tree having a depth greater than 1. At this point, walking up the prefix tree, item 702, which has a depth of 1, is reached. The process may then search for unprocessed items of the prefix tree having a depth greater than 1 and that are associated with more than one node. Examining the prefix tree of FIG. 7, an item 722 is such an item. Item 722 has a depth of 7 and is associated with nodes 43 and 431. This information may be added to the list of candidate virtual nodes of FIG. 8 as entry 812.

At this point, no unprocessed items of the prefix tree of FIG. 7 have a depth greater than 1 and are associated with more than one node. Therefore, no additional candidate virtual nodes may be added to the list of candidate virtual nodes.

Next, the candidate virtual nodes may be evaluated based on a selection method. In some embodiments, the selection method may be:
Compression(P)=(P.frequency−1)(P.size−1)−1, where Compression(P) is compression performance for a pattern P corresponding to a candidate virtual node, P.frequency is a number of the nodes having links corresponding to the pattern P, and P.size is a length, or depth, of the pattern P in the prefix tree. Each of the entries of the list of candidate virtual nodes of FIG. 8 has a corresponding calculated compression performance listed in a column labeled "Savings". The candidate virtual node having a largest compression performance may be selected as a virtual node. In this example, entries 802 and 804 (FIG. 8) both have the largest compression performance. When a tie occurs regarding a candidate virtual node having the largest compression performance, the candidate virtual node having a largest depth may be selected. In this example, the candidate virtual node corresponding to entry 802 may be selected as the virtual node. In other embodiments, ties among candidate virtual nodes with respect to a largest compression performance may be resolved using other techniques.

The selected virtual node corresponds to item 712 of the prefix tree. The prefix tree may then be updated by removing item 712, resulting in item 710 being linked to item 714 and item 722, and by updating the nodes associated with the items of the prefix tree to remove ones of the associated nodes corresponding to the selected virtual node. The list of candidate virtual nodes may be updated to reflect the updates to the prefix tree. For example, some virtual nodes may no longer correspond to the updated prefix tree and may be removed from further consideration. The process of selecting a virtual node from among the list of candidate virtual nodes, removing an item, corresponding to the selected virtual node, from the prefix tree, and updating the prefix tree may be repeated until no additional candidate virtual nodes may exist.

The virtual nodes may be created and added to a web graph and links corresponding to a pattern of the virtual nodes may be replaced with links to corresponding virtual nodes, as shown with respect to FIGS. 3 and 4.

Exemplary Processes

Figure 9:
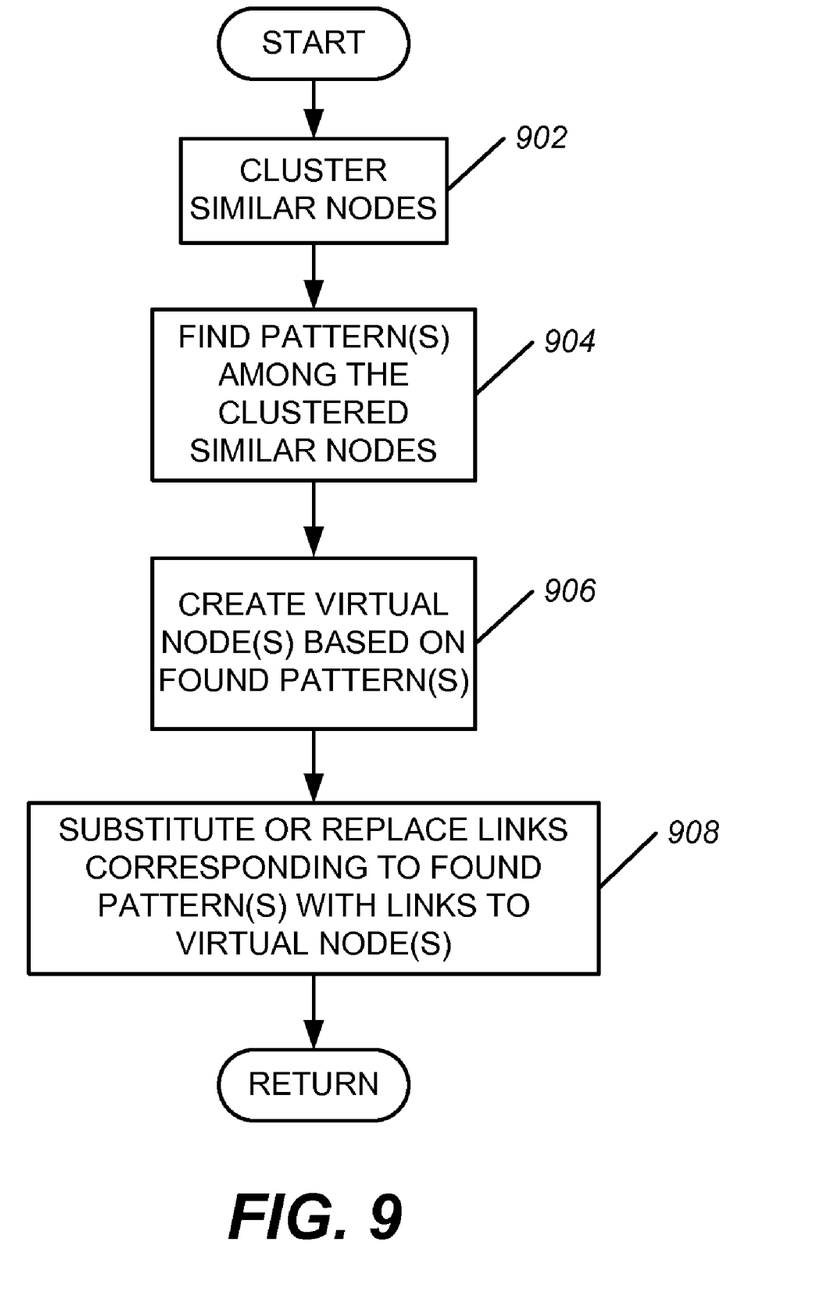
FIG. 9 is a flowchart of an exemplary process which may be performed in embodiments consistent with the subject matter of this disclosure.

FIG. 9 is a flowchart illustrating an exemplary process for performing web graph compression in embodiments consistent with the subject matter of this disclosure. The process may begin with a processing device, such as, for example, processing device 100, clustering similar nodes of a web graph (act 902).

Figure 10:
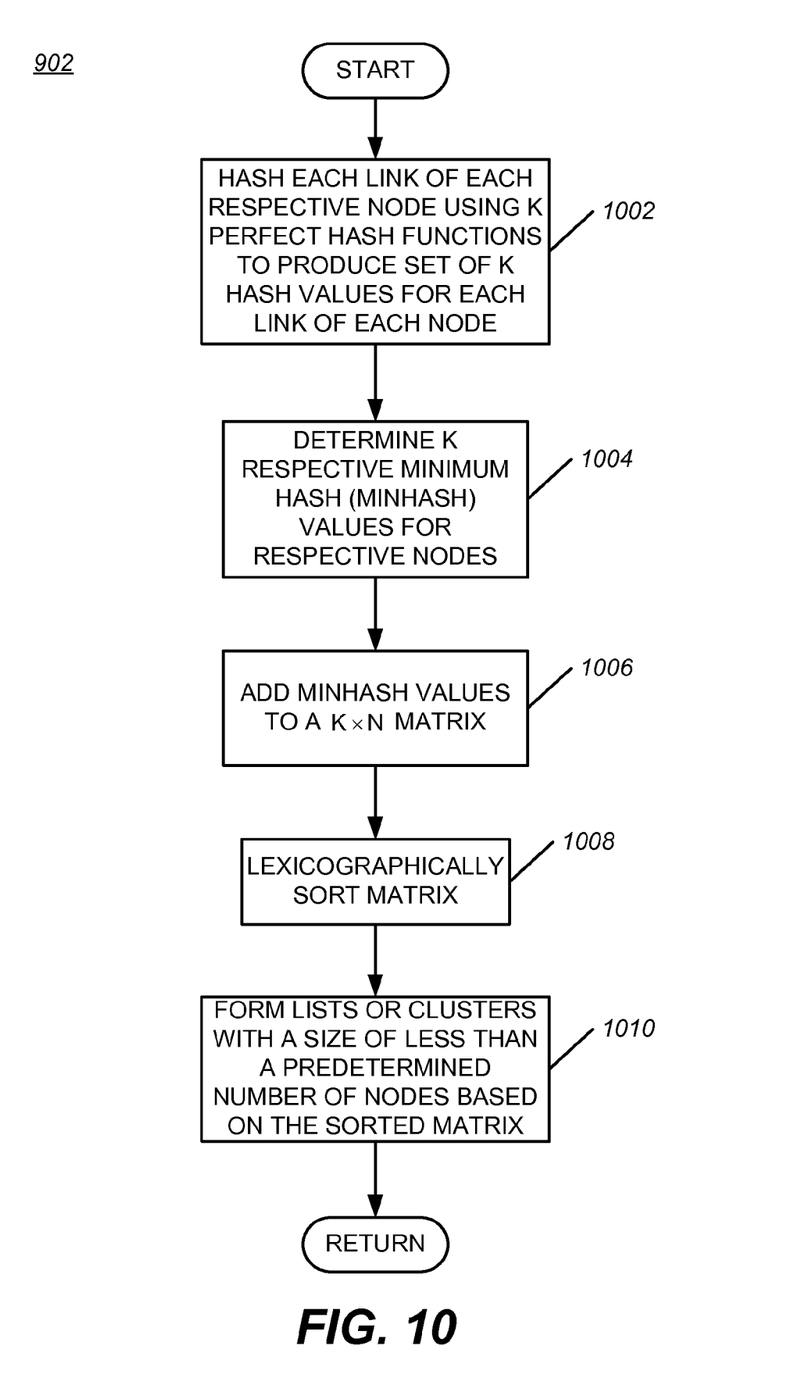
FIG. 10 is a flowchart of an exemplary process for performing act 902 of FIG. 9.

FIG. 10 is a flowchart illustrating act 902 in more detail. The processing device may apply k hash functions, such as, for example, perfect hash functions to each link of each respective node of the web graph to produce a set of k hash values for each of the links of each of the nodes (act 1002). A perfect hash function is a hash function that does not produce any collisions.

For each of the nodes, k respective minimum hash values may be determined (act 1004). For each of the nodes, a respective node ID and k minhash values may be added to a matrix to produce a n×k matrix (act 1006), where n may be a number of nodes of the web graph and k is a number of hash functions. Each row of the n×k matrix may correspond to a different node of the web graph. The n×k matrix may then be lexicographically sorted (act 1008). Lists of nodes, or clusters, with fewer than a predetermined number of nodes may be formed based on the lexicographically sorted n×k matrix (act 1010), as previously described with respect to FIG. 5. The predetermined number of nodes in a list or cluster may be 100, 1000, 500, or another suitable number.

In alternate embodiments, minhash values may not be used. For example, instead of using k minhash values, k permutation hash values, or other types of hash values, may be used in some embodiments.

Returning to FIG. 9, an attempt may be made to find one or more patterns among the clustered similar nodes (act 904).

Figure 11:
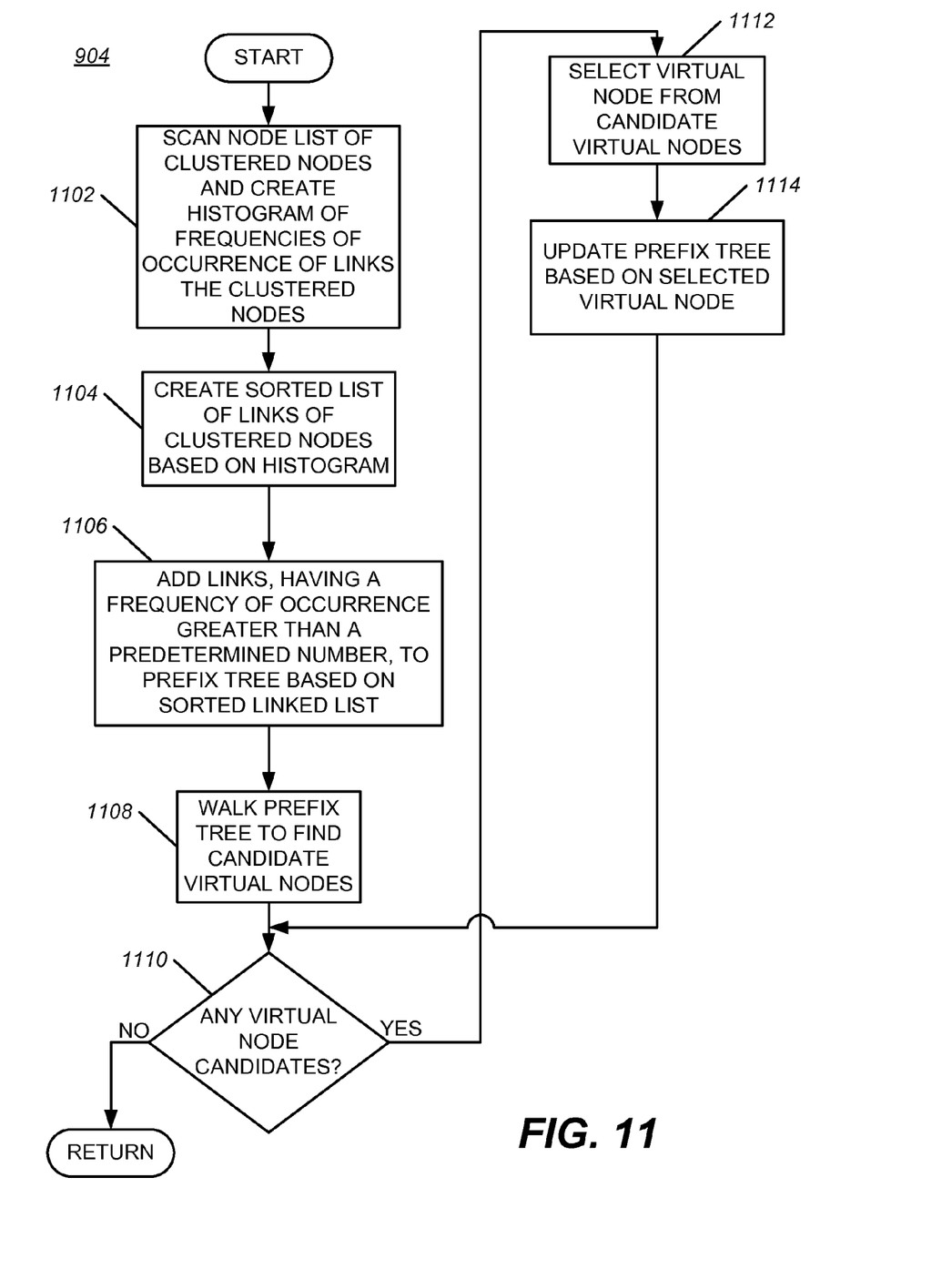
FIG. 11 is a flowchart of an exemplary process for performing act 904 of FIG. 9.

FIG. 11 is a flowchart illustrating exemplary processing, with respect to act 904, in more detail. The processing device may begin by scanning a node list with respect to the clustered nodes and creating a histogram of frequencies of occurrence of links of the clustered nodes (act 1102). The processing device may then create a sorted list of links of the clustered nodes based on the histogram (act in 1104). The sorted list of links may be sorted in a descending frequency of occurrence order. Links from the sorted list having a frequency of occurrence greater than a predetermined number, such as, for example, 1, or another number, may be added to a prefix tree as prefix tree items, in a manner as described with respect to FIG. 7 (act 1106). Each of the items of the prefix tree may include information with respect to a link and a node list including node IDs associated with the link in a respective position of the prefix tree.

After creation of the prefix tree, the processing device may walk the prefix tree to find candidate virtual nodes (act 1108).

Figure 12:
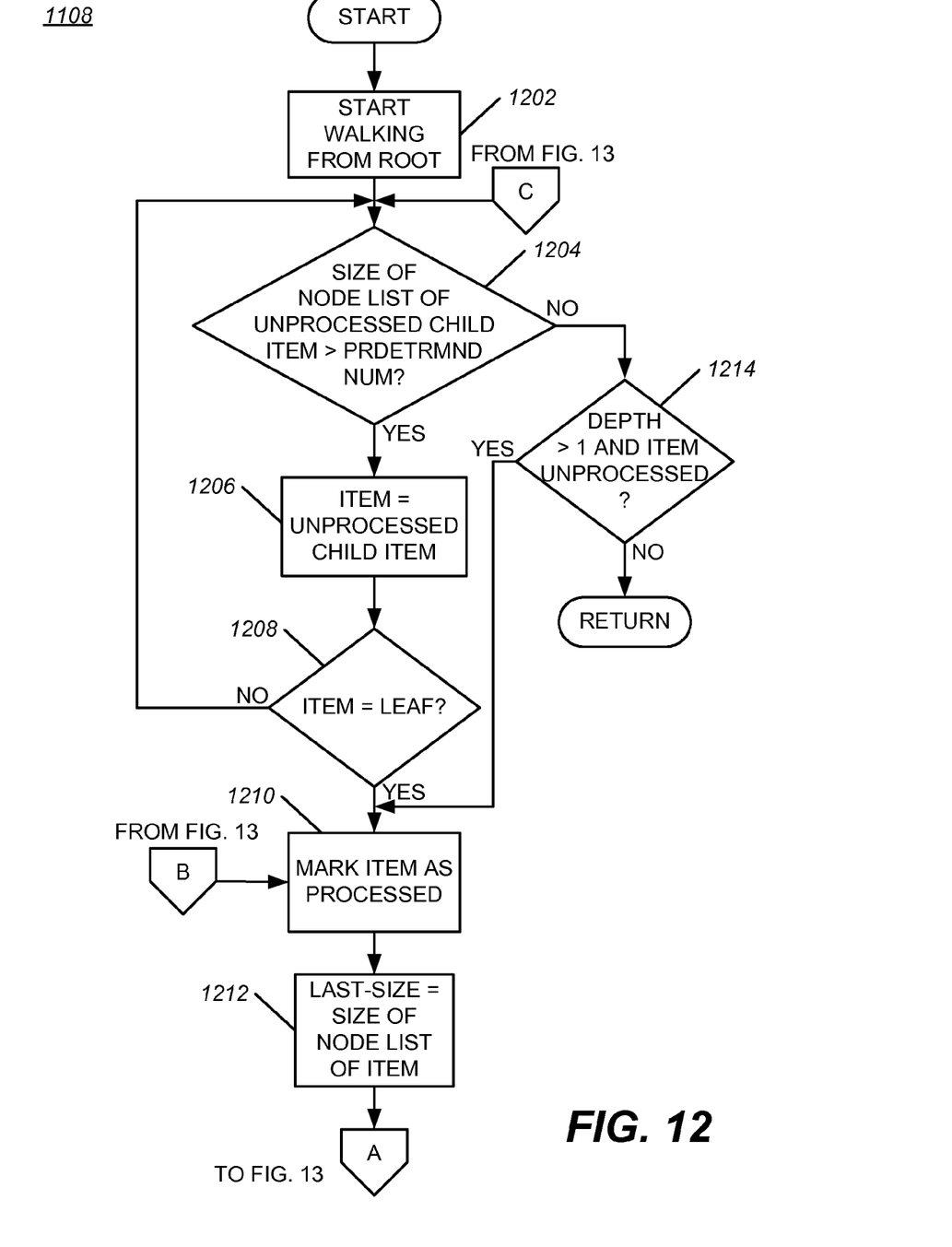
FIGS. 12 and 13 are flowcharts of an exemplary process for performing act 1108 of FIG. 11.
Figure 13:
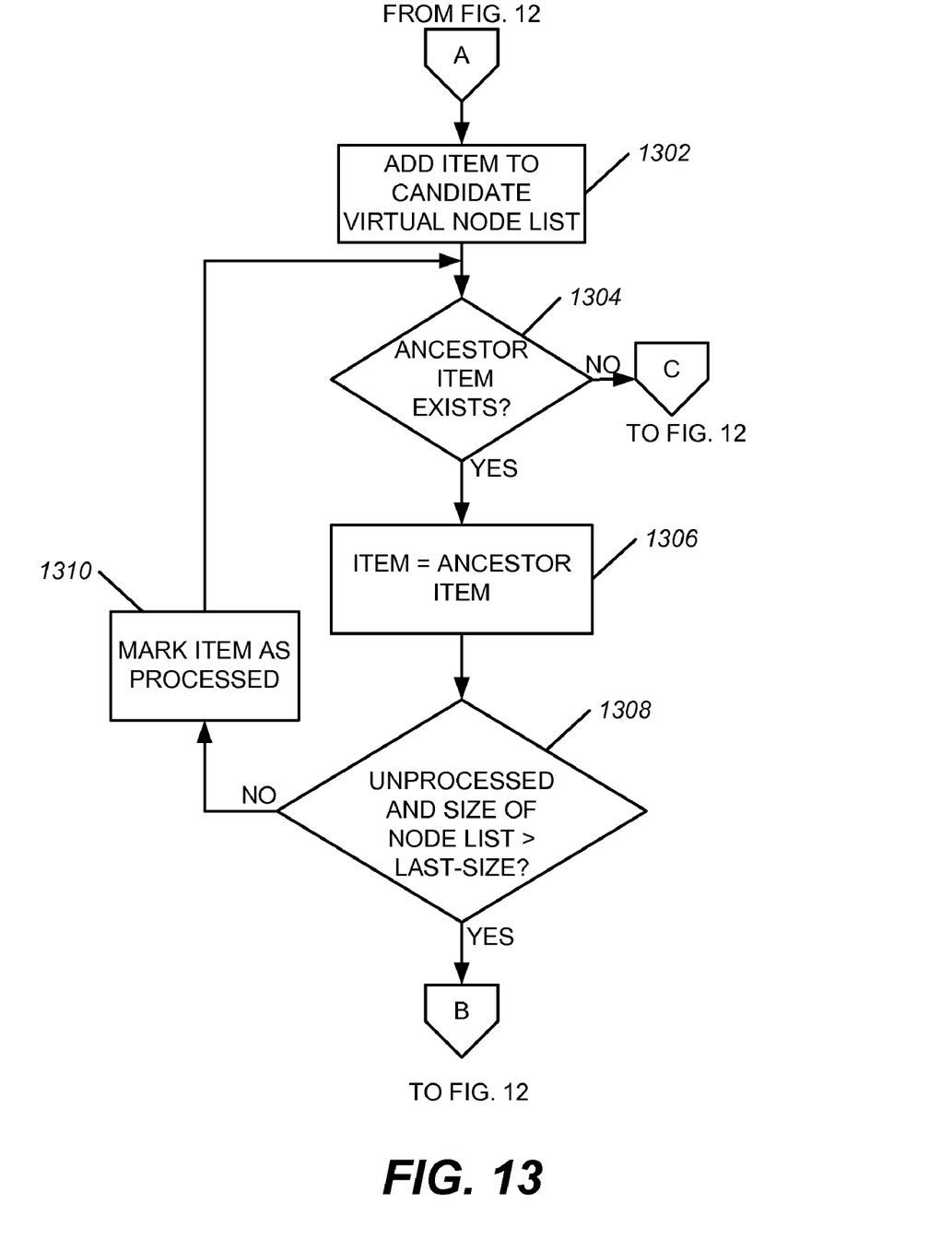

FIGS. 12 and 13 are flowcharts illustrating an exemplary process for performing act 1108 in more detail. The process may begin by walking the prefix tree starting from a root (act 1202). Initially, all items of the prefixed tree may be marked as unprocessed. The processing device may determine whether a size of a node list (number of associated nodes) of any unprocessed child items of a current item of the prefix tree is greater than a predetermined number, such as, for example, 1 or another number (act 1204). If the size of the node list of any of the unprocessed child items is greater than the predetermined number, then a current item is set to an unprocessed child item having a node list with a size greater than the predetermined number (act 1206). If more than one unprocessed child item has a node list greater than the predetermined number, then the child item having a largest sized node list may be set to the current item. The processing device may then determine if the current item is a leaf of the prefix tree (act 1208). If the current item is determined not to be a leaf of the prefix tree, then the processing device may again perform acts 1204-1208.

If, during act 1204, the processing device determines that the size of respective node lists of unprocessed child items of the current item of the prefix tree are not greater than the predetermined number, then the processing device may determine if a depth of the current item is greater than 1 and if the current item is unprocessed (act 1214). If the depth of the current item is not greater than one or the current item is not unprocessed then processing with respect to act 1108 is completed.

If, during act 1208, the processing device determines that the current item is a leaf of the prefix tree, or, during act 1214, the processing device determines that a depth of the current item is greater than 1 and the current item is unprocessed, then the processing device may mark the current item as processed (act 1210). A size of the node list of the current item may then be saved (act 1212). In this exemplary process, the size of the node list may be saved in a variable called "last-size".

The current item may then be added to a list of candidate virtual nodes (act 1302; FIG. 13). The processing device may then determine whether an ancestor item of the current item exists (act 1304). If the ancestor item of the current item is determined not to exist, then the processing device may perform act 1204 again. Otherwise, the current item may be set to the ancestor item (act 1306). The processing device may then determine whether the current item is marked as unprocessed and the size of a node list of the current item is greater than the previously saved size of a node list (last-size) (act 1308). If the current item is not marked as unprocessed or the size of the node list is not greater than the previously saved size of a node list, then the processing device may mark the current item as processed (act 1310) and acts 1304-1308 may again be performed. Otherwise, the processing device may again perform at 1210.

Returning to FIG. 11, the processing device may then examine the list of candidate virtual nodes to determine whether any suitable virtual node candidates exist (act 1110). If no suitable virtual node candidates exist, then the process of FIG. 11 is complete. Otherwise, the processing device may select a virtual node from the list of candidate virtual nodes (act 1112).

Figure 14:
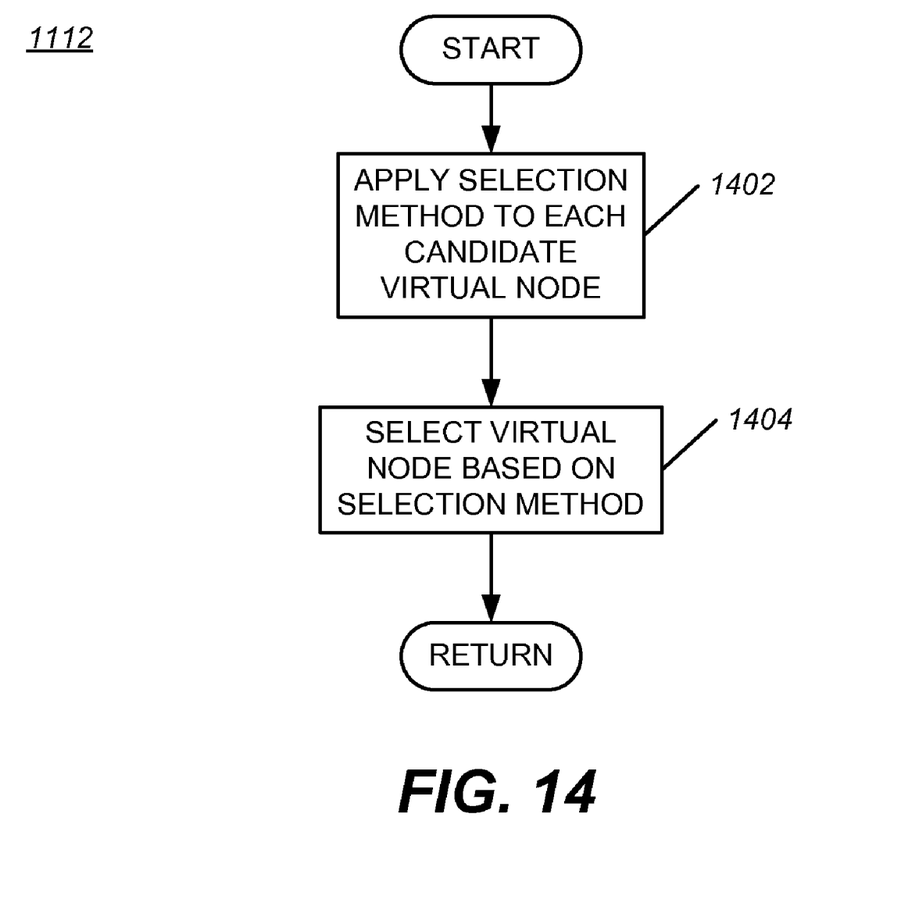
FIG. 14 is a flowchart of an exemplary process for performing act 1112 of FIG. 11.

FIG. 14 is a flowchart illustrating an exemplary process for performing act 1112. The process may begin with applying a selection method to each of the candidate virtual nodes (act 1402). In some embodiments, the selection method may include determining a compression performance with respect to each of the candidate virtual nodes as described previously. The processing device may then select one of the candidate virtual nodes as the virtual node based on the selection method (act 1404). In some embodiments, the processing device may select one of the candidate virtual nodes having a highest determined compression performance. The selected one of the candidate virtual nodes may not be globally optimal. If more than one of the candidate virtual nodes has a same highest determined compression performance, in some embodiments, the processing device may select one of the candidate virtual nodes having a highest determined compression performance and a highest depth.

Returning to FIG. 11, the prefix tree may then be updated by removing the item corresponding to the selected virtual node in a manner as described previously with respect to FIGS. 7 and 8 (act 1114). The processing device may again perform act 1110 to determine whether any suitable virtual node candidates exist (after the prefix table has been updated), may again select a virtual node from the candidate virtual nodes (act 1112), and may again update the prefix table based on the selected virtual node (act 1114).

If, during act 1110, no additional suitable virtual node candidates are determined to exist, then the process is completed.

Returning to FIG. 9, the processing device may then add the virtual node(s) to the web graph based on the virtual node(s) selected from the candidate virtual nodes (act 906). The processing device may then substitute or replace links of the web graph, corresponding to one or more patterns regarding the virtual node(s), with links to the virtual node(s) (act 908).

Figure 15:
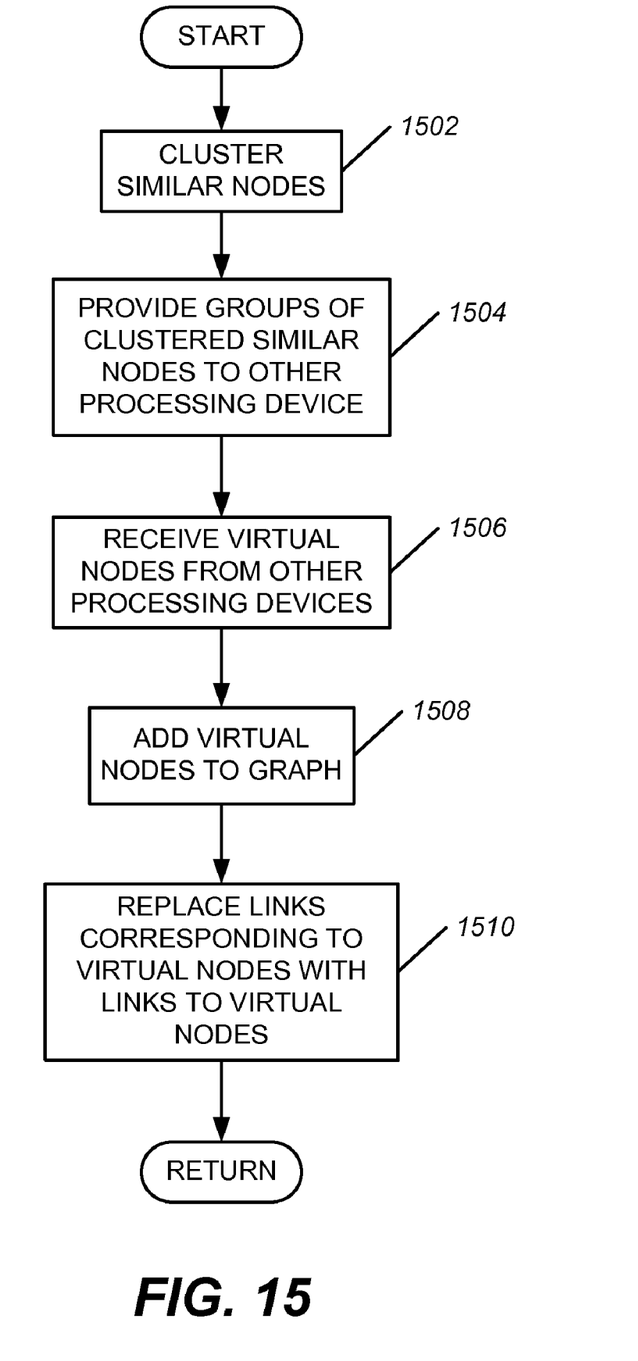
FIG. 15 is a flowchart of an exemplary process in which processing is performed by multiple processing devices.

Embodiments consistent with the subject matter of this disclosure may parallelize the above processes. FIG. 15 is a flowchart illustrating an exemplary process in such embodiments. The process may begin with a first processing device clustering similar nodes in a manner as described with respect to act 902, above (act 1502). The first processing device may then provide groups of the clustered similar nodes to a number of other processing devices (act 1504). The other processing devices may find patterns among the groups of clustered similar nodes, as described previously with respect to act 904. The first processing device may then receive information regarding virtual nodes from the other processing devices (act 1506). The first processing device may then add the virtual nodes to a web graph (act 1508) and may replace the links corresponding to the virtual nodes with links to the virtual nodes (act 1510) resulting in a compressed web graph.

The above-described processes are only exemplary. In other embodiments, variations of the above-described processes may be implemented. For example, a global list of a virtual nodes may be maintained. After building a prefix tree, the global list of virtual nodes may be accessed to determine whether any of the virtual nodes correspond to one or more items of the prefix tree. If so, the one or more corresponding items of the prefix tree may be removed before attempting to find candidate virtual nodes.

Complexity Analysis

A complexity of clustering, in embodiments consistent with the subject matter of this disclosure, it is $O(k E \lg(E))$, where k is a chosen number of hash functions and E is a number of all edges of a graph.

A complexity of mining clusters of nodes for virtual nodes also is $O(kElg(E))$. Each node may be passed once per iteration, and each edge, or link, may also be passed once. Building a histogram may be performed in $O(E)$ time. Each edge, or link, from each node may be added to a prefix tree once, in at worst $O(lg(E))$ time per edge because child items of an item of the prefix tree are a sorted set. Generating candidate virtual nodes may be performed in $O(E)$ time because the prefix tree may have at most E items, each item may be visited twice, and computation at a prefix tree item may be constant. Sorting of the candidate virtual nodes may be performed in no more than $O(Elg(E))$ time because a number of the candidate virtual nodes is bounded by $O(E)$.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents define the invention, rather than any specific examples given.

The invention claimed is:

1. A machine-implemented method for compressing a graph including a plurality of nodes and a plurality of links between ones of the plurality of nodes, the machine-implemented method comprising:
clustering similar nodes of the plurality nodes;
scanning a node list, corresponding to the clustered similar nodes of the plurality of nodes to determine frequencies of occurrence of links of the clustered similar nodes;
sorting a list of the links of the clustered similar nodes based on the determined frequencies of occurrence of the links of the clustered similar nodes to produce a sorted link list;
adding each of the links, having a frequency of occurrence greater than a predetermined number, from the sorted link list as an item of a prefix tree, along with an associated node list;
walking the prefix tree to produce a list of candidate virtual nodes;
determining a respective compression performance for each pattern corresponding to a respective candidate virtual node according to a compression performance formula;
sorting the list of candidate virtual nodes based on results of applying the compression performance formula;
selecting one of the list of candidate virtual nodes as a virtual node based on one of the patterns having a highest determined compression performance;
creating the virtual node; and
substituting links to the virtual node for links corresponding to the one of the patterns, wherein
the machine-implemented method is implemented either on one processing device or on a networked plurality of processing devices.

2. The machine-implemented method of claim 1, wherein the clustering of similar nodes of the plurality of nodes further comprises:
determining k hash values with respect to each of the plurality of nodes to produce a n×k matrix, where n is a number of the nodes in the graph,
sorting the n×k matrix lexicographically to produce a sorted n×k matrix, and
forming a list of ones of the plurality nodes having a size less than a predetermined number based on ones of the sorted n×k matrix having a corresponding same hash value.

3. The machine-implemented method of claim 2, wherein the hash values are minhash values.

4. The machine-implemented method of claim 1, wherein the walking of the prefix tree to produce a list of candidate virtual nodes further comprises:
walking the prefix tree to find a leaf of the prefix tree,
adding a candidate virtual node to the list of candidate virtual nodes based on the found leaf of the prefix tree when an associated node list has at least two nodes,
walking up the prefix tree from the leaf to attempt to find an ancestor item having an associated node list length greater than a length of the associated node list of the found leaf, and
adding a second candidate virtual node to the list of candidate virtual nodes based on the found ancestor item when the found ancestor item has the associated node list length greater than the associated node list length of the found leaf.

5. The machine-implemented method of claim 1, further comprising:
parallelizing the machine-implemented method by:
providing information with respect to groups of the clustered similar nodes to different processing devices of the networked plurality of processing devices, wherein:
each of the different processing devices performs, with respect to a group of the clustered similar nodes:
scanning a node list, corresponding to the group of clustered similar nodes of the plurality of nodes to determine frequencies of occurrence of links of the group of clustered similar nodes;
sorting a list of the links of the group of the clustered similar nodes based on the determined frequencies of occurrence of the links of the group of the clustered similar nodes to produce a sorted link list with respect to the group of the clustered similar nodes;
adding each of the links of the group of the clustered similar nodes, having a frequency of occurrence greater than a predetermined number, from the sorted link list with respect to the group of the clustered similar nodes as an item of a prefix tree, along with an associated node list;
walking the prefix tree to produce a list of candidate virtual nodes;
determining a respective compression performance for each pattern corresponding to a respective candidate virtual node according to a compression performance formula;
sorting the list of candidate virtual nodes based on results of applying the compression performance formula; and selecting one of the list of candidate virtual nodes as a virtual node based on one of the patterns having a highest determined compression performance.

6. A machine-implemented method for compressing a graph including a plurality of nodes and a plurality of links between ones of the plurality of nodes, the machine-implemented method comprising:

clustering similar nodes of the plurality nodes;

producing a sorted link list of the clustered similar nodes based on frequencies of occurrence of links of the clustered similar nodes;

adding each of the links from the sorted link list as an item of a prefix tree, along with an associated node list;

producing a list of candidate virtual nodes based on the prefix tree;

determining a respective compression performance for each pattern corresponding to a respective candidate virtual node according to a compression performance formula Compression(P)=(P.frequency−1)(P.size−1)−1, where Compression(P) is compression performance for a pattern P, P.frequency is a number of the clustered similar nodes having links corresponding to the pattern P, and P.size is a length of the pattern P in the prefix tree;

selecting one of the list of candidate virtual nodes as a virtual node based on one of the patterns having a highest determined compression performance; and substituting links to the virtual node for links corresponding to the one of the patterns, wherein the machine-implemented method is implemented either on one processing device or on a networked plurality of processing devices.

7. The machine-implemented method of claim 6, wherein the clustering of similar nodes of the plurality of nodes further comprises:

determining k hash values with respect to each of the plurality of nodes to produce a n×k matrix, where n is a number of the nodes in the graph, sorting the n×k matrix lexicographically to produce a sorted n×k matrix, and forming a list of ones of the plurality nodes having a size less than a predetermined number based on ones of the sorted n×k matrix having a corresponding same hash value.

8. The machine-implemented method of claim 7, wherein the hash values are minhash values.

9. The machine-implemented method of claim 6 further comprising:

removing an item corresponding to the virtual node from the prefix tree, and adjusting associated nodes of the items of the prefix list to remove any nodes corresponding to associated nodes of the item corresponding to the virtual node.

10. A processing device comprising:

at least one processor; and a memory connected to the at least one processor, the memory including instructions for performing a method comprising:

clustering groups of similar nodes of a graph;

producing a sorted link list of the clustered similar nodes based on frequencies of occurrence of links of the clustered similar nodes;

adding each of the links from the sorted link list as an item of a prefix tree, along with an associated node list;

producing a list of candidate virtual nodes based on the prefix tree;

determining a respective compression performance for each pattern corresponding to a respective candidate virtual node according to a compression performance formula Compression(P)=(P.frequency−1)(P.size−1)−1, where Compression(P) is compression performance for a pattern P, P.frequency is a number of the clustered similar nodes having links corresponding to the pattern P, and P.size is a length of the pattern P in the prefix tree;

selecting one of the list of candidate virtual nodes as a virtual node based on one of the patterns having a highest determined compression performance; and substituting links to the virtual node for links corresponding to the one of the patterns.

11. The system of claim 10, wherein the method further comprises:

instructions for removing an item corresponding to the virtual node from the prefix tree, and instructions for adjusting the node lists of the items of the prefix list to remove any nodes corresponding to the node list of the item corresponding to the virtual node.

* * * * *